US012467820B2

(12) United States Patent
Hao et al.

(10) Patent No.: US 12,467,820 B2
(45) Date of Patent: Nov. 11, 2025

(54) METHODS AND SYSTEMS FOR LEAKAGE ANALYSIS OF URBAN PIPELINES AND STORAGE MEDIA

(71) Applicant: CHANGZHOU UNIVERSITY, Jiangsu (CN)

(72) Inventors: Yongmei Hao, Changzhou (CN); Min Li, Changzhou (CN); Juncheng Jiang, Changzhou (CN); Zhixiang Xing, Changzhou (CN); Qiang Yao, Changzhou (CN); Lihua Wang, Changzhou (CN); Fan Wu, Changzhou (CN); Zhengqi Wu, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 361 days.

(21) Appl. No.: 18/317,053

(22) Filed: May 12, 2023

(65) Prior Publication Data
US 2023/0417622 A1 Dec. 28, 2023

Related U.S. Application Data

(63) Continuation-in-part of application No. PCT/CN2022/143171, filed on Dec. 29, 2022.

(30) Foreign Application Priority Data

Jun. 10, 2022 (CN) .......................... 202210649566.1

(51) Int. Cl.
*G01M 3/24* (2006.01)
*G06N 3/08* (2023.01)
(Continued)

(52) U.S. Cl.
CPC .............. *G01M 3/243* (2013.01); *G06N 3/08* (2013.01); *F17D 5/06* (2013.01); *G01M 3/00* (2013.01); *G06N 3/09* (2023.01)

(58) Field of Classification Search
USPC .......................................................... 702/51
See application file for complete search history.

(56) References Cited

U.S. PATENT DOCUMENTS

2014/0229124 A1\* 8/2014 Albertao .................. F17D 5/06
702/47
2015/0052979 A1\* 2/2015 Cho ....................... G01M 3/243
73/40.5 A (Continued)

FOREIGN PATENT DOCUMENTS

| CN | 111735583 A | 10/2020 |
|---|---|---|
| CN | 112539887 A | 3/2021 |
| WO | 2019094562 A1 | 5/2019 |

OTHER PUBLICATIONS

International Search Report in PCT/CN2022/143171 mailed on Mar. 15, 2023, 6 pages.
(Continued)

*Primary Examiner* — Paul D Lee
(74) *Attorney, Agent, or Firm* — METIS IP LLC

(57) ABSTRACT

The embodiments of the present disclosure provide a method and a system for leakage analysis of an urban pipeline, and a storage medium. The method includes: obtaining sample signal data of an original signal and a corresponding first waveform diagram; obtaining at least two first components and a second component by processing the sample signal data based on preset iteration operations; determining a mutual information entropy of two adjacent first components in the at least two first components; determining high-frequency signal data of the original signal based on the mutual information entropy; determining an effective characteristic signal and a corresponding second waveform diagram based on the high-frequency signal data and the sample signal data; determining whether the urban pipeline leaks based on the second waveform diagram; and
(Continued)

in response to that the urban pipeline leaks, determining a leakage aperture of the urban pipeline based on the effective characteristic signal.

11 Claims, 10 Drawing Sheets

(51) Int. Cl.
    *F17D 5/06*     (2006.01)
    *G01M 3/00*     (2006.01)
    *G06N 3/09*     (2023.01)

(56) References Cited

U.S. PATENT DOCUMENTS

| | | | |
|---|---|---|---|
| 2018/0246004 A1* | 8/2018 | Zhang | G01M 3/2815 |
| 2020/0103306 A1* | 4/2020 | Mine | G01M 3/007 |
| 2020/0210826 A1* | 7/2020 | Liu | G06N 3/08 |
| 2023/0417622 A1 | 12/2023 | Hao et al. | |

OTHER PUBLICATIONS

Written Opinion in PCT/CN2022/143171 mailed on Mar. 15, 2023, 8 pages.

Hou, Yifan, Research on Pipeline Leak Detection Based on Local Characteristic-scale Decomposition and Semi-supervised FCM, Chinese Master's Theses Full-text Database, 2019, 74 pages.

Hu, Rongbo, A Research on Reciprocating Compressor Fault Diagnosis Method Based on LCD and MSE, Chinese Master's Theses Full-text Database, 2016, 61 pages.

Cheng, Junsheng et al., Local Feature Scale Decomposition Method and Its Application, Hunan University Press, 2019. 5 pages.

Chen, Hao et al., Satellite Communication and Digital Signal Processing, Shanghai Jiao Tong University Press, 2011, 9 pages.

Tong, Rui et al., Gear Fault Feature Extraction Based on LCD and Bispectrum Analysis, Journal of Academy of Armored Force Engineering, 32(5): 42-48, 2018.

Wang, Bingju, Sensors Fault Diagnosis Method Based on Information Entropy, Chinese Master's Theses Full-text Database, 2017, 61 pages.

* cited by examiner

400

410 Determining at least one extreme point of initial signal data and a time corresponding to the at least one extreme point

420 Obtaining at least one baseline signal point corresponding to the at least one extreme point

430 Obtaining a baseline signal by processing the at least one baseline signal point.

440 Obtaining a candidate first component based on the baseline signal and the initial signal data

450 In response to the candidate first component not satisfying a second preset condition, using the candidate first component as the initial signal data, and repeating above operations

460 In response to the candidate first component satisfying the second preset condition, obtaining a first component

```
┌─────────────────────────────────────────────┐  610
│  Obtaining characteristic parameters of an  │ ⌇
│         effective characteristic signal     │
└─────────────────────────────────────────────┘
                       │
                       ▼
┌─────────────────────────────────────────────┐  620
│ Determining a leakage aperture of an urban  │ ⌇
│   pipeline by processing the characteristic │
│                 parameters                  │
└─────────────────────────────────────────────┘
```

FIG. 6

METHODS AND SYSTEMS FOR LEAKAGE ANALYSIS OF URBAN PIPELINES AND STORAGE MEDIA

CROSS REFERENCE TO RELATED APPLICATION

This application is a continuation-in-part application of International Patent Application PCT/CN2022/143171, filed on Dec. 29, 2022, which claims priority of the Chinese Patent Application No. 202210649566. 1, filed on Jun. 10, 2022, the entire contents of each of which are hereby incorporated by reference.

TECHNICAL FIELD

The present disclosure relates to the field of data processing, and in particular to a method and a system for leakage analysis of an urban pipeline, and a storage medium.

BACKGROUND

Leakage of urban pipelines not only affects the transportation of resources, causes great losses to economic development and a large waste of resources, but also poses a huge threat to social public safety. Among various pipeline detection methods, infrasonic detection method(s) have a high sensitivity, a low false alarm rate, good adaptability, convenient installation and maintenance, and have a good application effect. However, pipeline leakage infrasonic signal(s) are easily disturbed by the environment, medium, and other factors during a propagation process, and various noises are entrained, which affects the accuracy of pipeline leakage detection. Therefore, how to process the infrasonic signal(s) and extract the infrasonic signal(s) from mixed signals becomes a key to pipeline leakage detection.

For the infrasonic leakage signal(s), domestic and foreign scholars have done a lot of research and proposed a variety of processing methods. For example, local characteristic scale decomposition (LCD) proposed in "A New Time-Frequency Analysis Method-Local Characteristic-scale Decomposition" by Yang Yu et al., is self-adaptive. Compared with empirical mode decomposition (EMD), it has fewer rounds of iterations and faster decomposition rate. Decomposed signals are more real and accurate, and endpoint effect is weaker than EMD. In "Characteristic Extraction of Infrasonic Signals Based on Multi-Scale Decomposition", Wang Meng proposed to apply a local characteristic scale decomposition algorithm to the characteristic extraction of the infrasonic signals. However, when selecting main signal components after the local characteristic scale decomposition, this paper relies on the observation of the local characteristic scale decomposition diagram. High-frequency signal components and low-frequency signal components with large differences can be distinguished through observation, but there is subjectivity, and it is easy to lose the low-frequency signal components containing effective information. Besides, the weaker the leakage signals, the more difficult it is to distinguish the high-frequency signal components from the low-frequency signal components. Selecting the main signal components by observation may easily affect the accuracy of characteristic extraction of the pipeline infrasonic leakage signals, thus reducing the accuracy of pipeline leak detection.

Therefore, it is desirable to provide a method and a system for analyzing leakage of an urban pipeline, and a storage medium to improve the accuracy of pipeline leakage detection.

SUMMARY

One or more embodiments of the present disclosure provide a method for leakage analysis of an urban pipeline. The method may include: obtaining sample signal data of an original signal and a first waveform diagram corresponding to the sample signal data; obtaining at least two first components and a second component by processing the sample signal data based on preset iteration operations; determining a mutual information entropy of two adjacent first components in the at least two first components; determining high-frequency signal data of the original signal based on the mutual information entropy; determining an effective characteristic signal and a second waveform diagram corresponding to the effective characteristic signal based on the high-frequency signal data and the sample signal data; determining whether the urban pipeline leaks based on the second waveform diagram; and in response to that the urban pipeline leaks, determining a leakage aperture of the urban pipeline based on the effective characteristic signal.

One or more embodiments of the present disclosure provide a system for leakage analysis of an urban pipeline. The system may include: an obtaining module configured to obtain sample signal data of an original signal and a first waveform diagram corresponding to the sample signal data; a processing module configured to obtain at least two first components and a second component by processing the sample signal data based on preset iteration operations; determine a mutual information entropy of two adjacent first components in the at least two first components; determine high-frequency signal data of the original signal based on the mutual information entropy; and determine an effective characteristic signal and a second waveform diagram corresponding to the effective characteristic signal based on the high-frequency signal data and the sample signal data; and a determination module configured to determine whether the urban pipeline leaks based on the second waveform diagram; and in response to that the urban pipeline leaks, determine a leakage aperture of the urban pipeline based on the effective characteristic signal.

One or more embodiments of the present disclosure provide a non-transitory computer-readable storage medium storing computer instructions. After reading the computer instructions in the storage medium, a computer may perform the method for leakage analysis of the urban pipeline.

Compared with the prior art, beneficial effects achieved by the present disclosure are as follows.

The analysis method of the present disclosure may quantitatively determine the combination of high-frequency parts in original infrasonic signals using characteristic scale decomposition (LCD) and a mutual information entropy to prevent signals containing effective information from being missed. The present disclosure may check the effectiveness of signal processing by using the mutual information entropy with the similarity coefficient from the perspective of time, and further obtain an effective characteristic signal and an effective time-domain waveform diagram corresponding to the effective characteristic signal, thereby improving the effect of denoising the original infrasonic signals. The present disclosure may analyze whether the urban pipeline leaks through the effective time-domain waveform diagram, thereby improving the accuracy of the analysis result; and for the leaking urban pipeline, the present disclosure may analyze a leakage aperture of the urban pipeline according to an average peak value and a mean square amplitude of the effective characteristic signal and a preset aperture function, providing a data basis for formulating emergency repair plans, which can reduce losses and potential dangers caused by leakage.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a flowchart illustrating an exemplary first preset algorithm according to some embodiments of the present disclosure;

FIG. 6 is a flowchart illustrating an exemplary process for determining a leakage aperture of an urban pipeline according to some embodiments of the present disclosure;

DETAILED DESCRIPTION

Figure 1:
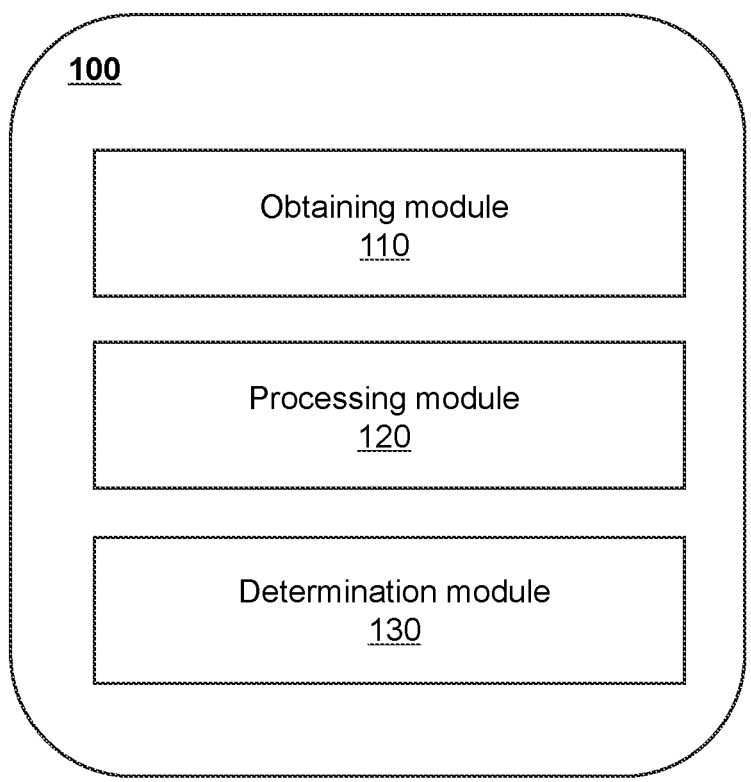
FIG. 1 is a block diagram illustrating a system for leakage analysis of an urban pipeline according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a block diagram illustrating an exemplary system for leakage analysis of an urban pipeline according to some embodiments of the present disclosure. As shown in FIG. 1, a system 100 for leakage analysis of an urban pipeline may include an obtaining module 110, a processing module 120, and a determination module 130.

The obtaining module 110 may be configured to obtain sample signal data of an original signal and a first waveform diagram corresponding to the sample signal data.

The processing module 120 may be configured to obtain at least two first components and a second component by processing the sample signal data based on preset iteration operations; determine a mutual information entropy of two adjacent first component signals of the at least two first component signals; determine high-frequency signal data of the original signal based on the mutual information entropy; and determine an effective characteristic signal and a second waveform diagram corresponding to the effective characteristic signal based on the high-frequency signal data and the sample signal data.

The determination module 130 may be configured to determine whether the urban pipeline leaks based on a second waveform diagram; and in response to that the urban pipeline leaks, determine a leakage aperture of the urban pipeline based on the effective characteristic signal.

More descriptions regarding the obtaining module 110, the processing module 120, and the determination module 130 may be found in related descriptions below It should be noted that the above descriptions of the system for leakage analysis of the urban pipeline and modules thereof are only for convenience of illustration, and do not limit the present disclosure to the scope of the embodiments. It can be understood that for those skilled in the art, after understanding the principle of the system, it is possible to combine various modules arbitrarily or form a subsystem to connect with other modules without departing from this principle. In some embodiments, the obtaining module 110, the processing module 120, and the determination module 130 disclosed in FIG. 1 may be different modules in one system, or one module may implement the functions of the above-mentioned two or more modules. For example, two or more modules may share one storage module, or each module may have its own storage module. Such variations are within the protection scope of the present disclosure.

Figure 2:
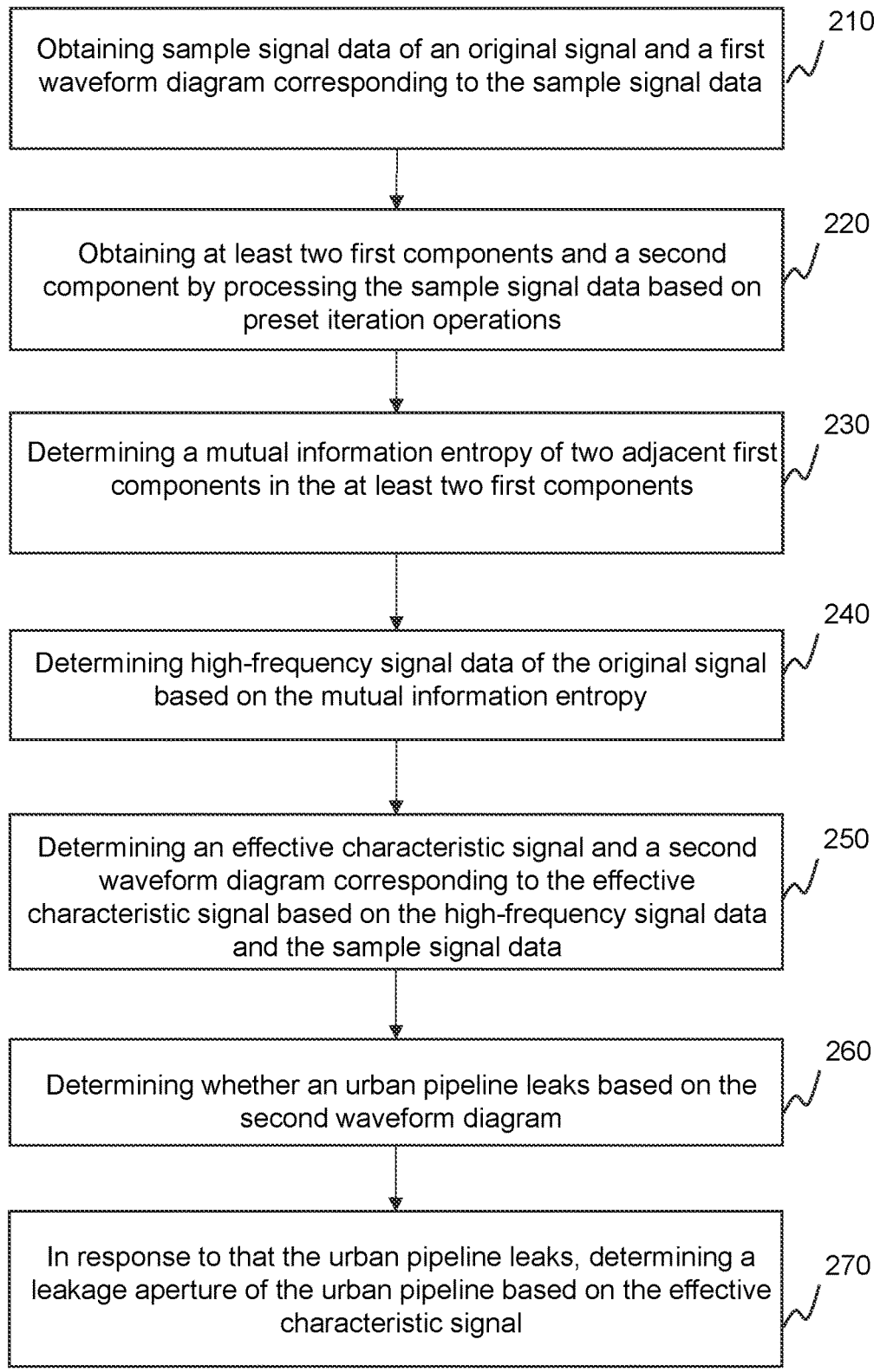
FIG. 2 is a flowchart illustrating an exemplary method for leakage analysis of an urban pipeline according to some embodiments of the present disclosure.

FIG. 2 is a flowchart illustrating an exemplary method for leakage analysis of an urban pipeline according to some embodiments of the present disclosure. As shown in FIG. 2, the process 200 may include following operations. In some embodiments, the process 200 may be performed by the system 100 for leakage analysis of the urban pipeline.

In 210, sample signal data of an original signal and a first waveform diagram corresponding to the sample signal data may be obtained. In some embodiments, the operation 210 may be performed by the obtaining module 110.

The original signal refers to a signal generated by the urban pipeline during a medium transmission process. The urban pipeline may include but not limited to, a water supply pipeline, a drainage pipeline, a gas pipeline, a heat pipeline, a power cable, or the like. The medium may be any one of a liquid medium, a gas medium, or the like. The signal may include an infrasonic wave signal, an ultrasonic wave signal, a negative pressure wave signal, and a stress wave signal, or the like, or any combination thereof.

The original signal may be collected by an information collector. The signal collector may include an ultrasonic sensor, an infrasonic sensor, a pressure sensor, or the like. In some embodiments, the original signal may be the infrasonic signal, and the infrasonic signal may be detected by the infrasonic sensor installed on the urban pipeline (e.g., an upstream and a downstream of the urban pipeline). In some embodiments, the original signal may be the negative pressure wave signal, and the negative pressure wave signal may be detected by the pressure sensor installed on the urban pipeline.

The sample signal data refers to data obtained by sampling the original signal. For example, the signal collector may continuously collect the original signal at intervals to obtain time-continuous sample signal data.

The sample signal data may be obtained in various ways. For example, the obtaining module 110 may directly obtain the sample signal data from the signal collector. As another example, the obtaining module 110 may obtain the sample signal data from a storage device.

The first waveform diagram refers to a waveform diagram of the sample signal data. In some embodiments, the first waveform diagram may be a time-domain waveform diagram of the sample signal data.

In 220: at least two first components and a second component may be obtained by processing the sample signal data based on preset iteration operations. In some embodiments, the operation 220 may be performed by the processing module 120.

The first components refer to main components obtained by adaptively decomposing the sample signal data. In some embodiments, the first components may be a plurality of intrinsic mode functions (IMFs) obtained by adaptively decomposing the sample signal data using empirical mode decomposition (EMD). In some embodiments, the first components may be a plurality of intrinsic scale components (ISCs) obtained by adaptively decomposing the sample signal data using local characteristic scale decomposition (LCD). In some embodiments, the first components may be a plurality of ISCs obtained by adaptively decomposing the sample signal data using improved local characteristic-scale decomposition (ILCD).

The second component refers to a residual component after adaptively decomposing the sample signal data. In some embodiments, the second component may be a residual component after adaptively decomposing the sample signal data using the EMD and removing the plurality of IMFs. In some embodiments, the second component may be a residual component after adaptively decomposing the sample signal data using the LCD and removing the plurality of ISCs. In some embodiments, the second component may be a residual component after adaptively decomposing the sample signal data using the ILCD and removing the plurality of ISCs.

The preset iteration operations refer to iteration operations for processing the sample signal data. In some embodiments, the preset iteration operations may be performed based on a time-frequency analysis manner. In some embodiments, the time-frequency analysis manner may include any one or combination of various feasible manners such as LCD, ILCD, EMD, and Hilbert transform (HT). More descriptions regarding determining the first components and the second component based on the preset iteration operations may be found in FIG. 3 and related descriptions thereof.

In some embodiments, the processing module 120 may obtain an extreme point of the sample signal data; and when the extreme point satisfies a restriction strategy, obtain the at least two first components and the second component by processing the sample signal data based on the preset iteration operations.

The extremum may be a maximum value or a minimum value in a certain sub-interval of the sample signal data. The extreme point may be an ordinate value corresponding to the extremum.

The extreme point may be obtained in various ways. In some embodiments, the processing module 120 may obtain the extreme point in a sub-interval by performing a derivation operation on the sample signal data in the sub-interval. The processing module 120 may obtain the extreme point in a certain sub-interval by processing the sample signal data in the sub-interval using mathematical software through an interface.

The restriction strategy refers to a condition that the extreme point needs to satisfy. When all extreme points satisfy the restriction strategy, the processing module 120 may obtain the first components and the second component by processing the sample signal data based on the preset iteration operations.

In some embodiments, the extreme point may include a maximum point and a minimum point. The maximum point refers to an extreme point corresponding to an extremum with a positive sign, and the minimum point refers to an extreme point corresponding to an extremum with a negative sign.

In some embodiments, the restriction strategy may include: any two adjacent maximum point and adjacent minimum point may be strict monotonic, and any two adjacent maximum points or any two adjacent minimum points may satisfy a following formula:

$$\alpha A_{k+1} + (1-\alpha)X_{k+1} = 0$$

where $X_{k+1}$ represents a (k+1)th extreme point of the original signal, $A_{k+1}$ represents a function value reflecting the extreme point $X_{k+1}$ at a corresponding time $T_{k+1}$, and a denotes a constant parameter. In practical application, when $\alpha$ is 0.5, a ratio of $A_{k+1}$ to $X_{k+1}$ may remain constant.

The two adjacent maximum point and minimum point refer to a maximum point and a minimum point that are adjacent to each other within an entire data segment of the sample signal data. For example, in the first waveform diagram, any two adjacent peak and valley may be the two adjacent maximum point and minimum point.

The two adjacent maximum points (or the two adjacent minimum points) refer to maximum points (or minimum points) that are adjacent to each other in the entire data segment of the sample signal data. For example, in the first waveform diagram, any two adjacent peaks may be the two adjacent maximum points, and any two adjacent valleys may be the two adjacent minimum points.

In 230, the mutual information entropy of two adjacent first components in the at least two first components may be determined. In some embodiments, the operation 230 may be performed by the processing module 120.

The two adjacent first components refer to two first components that have an adjacent relationship in the at least two first components arranged according to a preset arrangement rule. In some embodiments, the preset arrangement rule may be a frequency-related arrangement rule. For example, the preset arrangement rule may be to arrange the at least two first components according to high-frequency signal components included in the first components. In some embodiments, the preset arrangement rule may be an arrangement rule related to a sequence in which the first components are generated. For example, the preset arrangement rule may be to arrange the at least two first components according to the sequence in which the at least two first components are decomposed and generated.

The mutual information entropy may be used to measure a degree of correlation between the adjacent two first components. The mutual information entropy may be determined in various ways.

In some embodiments, the mutual information entropy of the two adjacent first components in the at least two first components may be determined by a following formula:

$$I(M;N)=H(M)-H(M|N)$$

wherein M is a first component, N is another first component, and M is adjacent to N; I(M; N) is the mutual information entropy of M and N, H(M) is the information entropy of M, and H(M|N) is the conditional entropy of M when N is known.

In some embodiments, the mutual information entropy of the two adjacent first components in the at least two first components may be determined by a following formula:

$$P(I_i; I_{i+1}) = -\int_{I_{i+1}}\int_{I_i} p(I_i, I_{i+1})\log\frac{p(I_i, I_{i+1})}{p(I_i)p(I_{i+1})}dI_i dI_{i+1}$$

wherein i represents an iteration round, $I_i$ represents a first component obtained by an iteration of the ith round, $p(I_i)$ represents a marginal probability distribution of the $I_i$, $I_{i+1}$ represents a first component obtained by an iteration of an (i+1)th round, $p(I_{i+1})$ represents a marginal probability distribution of the $I_{i+1}$, and $p(I_i, I_{i+1})$ represents a joint probability distribution of the two first components.

In some embodiments, when the two adjacent first components are correlated or mutually independent, the mutual information entropy may be the minimum and the value may be 0, i.e., there is no identical information between the two first components. On the contrary, when the two adjacent first components are more interdependent, the value of the mutual information entropy may be larger, i.e., the more the same information may be contained between the two first components.

In 240, high-frequency signal data of the original signal may be determined based on the mutual information entropy. In some embodiments, the operation 240 may be performed by the processing module 120.

The high-frequency signal data refers to a combination of a plurality of first components with relatively high frequencies.

The high-frequency signal data may be determined in various ways. In some embodiments, the high-frequency signal data may be determined based on a judgment threshold. For example, at least one first component with a frequency higher than the judgment threshold may be determined as the high-frequency signal data. The judgment threshold may be a preset value or a value determined according to experience.

In some embodiments, the processing module 120 may determine the high-frequency signal data of the original signal based on the mutual information entropy, including: using a first local minimum value in the mutual information entropy as a dividing line to distinguish a high-frequency part and a low-frequency part of the original signal, and obtaining the high-frequency signal data by a following formula:

$$HC_z(t) = \sum_{i=1}^{z} I_i$$

wherein $HC_z(t)$ represents the high-frequency signal data, Z denotes a positive integer less than n, a mutual information entropy between $I_{Z-1}$ and $I_z$ is the first local minimum value, $I_{Z-1}$ represents a (Z−1)th first component, and $I_z$ represents a Zth first component.

The local minimum value may be a minimum mutual information entropy in a certain interval. For example, the first local minimum value may be a minimum mutual information entropy in a first preset interval, or a minimum mutual information entropy that appears for the first time in all preset intervals. The preset interval may be an interval including a plurality of first components preset by the system or artificially selected.

In some embodiments, the processing module 120 may arrange the first components according to a count of included high-frequency parts in a descending manner, calculate the mutual information entropy between each adjacent first components, divide preset intervals for all mutual information entropy, determine the minimum mutual information entropy that appears for the first time as the first local minimum value in all preset intervals, and combine one or more first components before the first local minimum value as the high-frequency signal data. It should be noted that during the process of obtaining the first components, a high-frequency signal (e.g., an effective signal) included in the first components may gradually decrease, and a low-frequency signal (e.g., a noise signal) may gradually increase. That is, the first determined first component may contain the most high-frequency effective information and may not contain low-frequency noise information, and the last determined first component may contain the most low-frequency noise information and may not contain the high-frequency effective information. Therefore, when the local minimum value appears in calculating the mutual information entropy between adjacent first components, it represents that the adjacent first components may contain the least identical information, i.e., one of the adjacent first components may contain the high-frequency effective information and another first component may contain the low-frequency noise information.

In 250, an effective characteristic signal and a second waveform diagram corresponding to the effective characteristic signal may be determined based on the high-frequency signal data and the sample signal data. In some embodiments, the operation 250 may be performed by the processing module 120.

The effective characteristic signal may be an effective signal containing the high-frequency effective information.

A screening process of the original signal based on the mutual information entropy may be processed from the perspective of space, while the signal processing may be generally carried out from the perspective of time. The effectiveness of the signal processing may be verified using the mutual information entropy from the perspective of time based on a similarity manner.

In some embodiments, the processing module 120 may calculate a similarity coefficient between the high-frequency signal data and the sample signal data, and extract an effective characteristic component from the high-frequency signal data according to the similarity coefficient. Further, the processing module 120 may determine the effective characteristic signal based on the effective characteristic component.

In some embodiments, the processing module 120 may perform modeling or use various data analysis algorithms, such as cross-correlation function analysis, etc., to obtain the similarity coefficient between the high-frequency signal data and the sample signal data by analyzing and processing the high-frequency signal data and the sample signal data.

In some embodiments, the processing module 120 may calculate a similarity coefficient between each first component in the high-frequency signal data and the original signal one by one; and when the similarity coefficient is greater than a similarity coefficient threshold, determine the first component corresponding to the similarity coefficient in the high-frequency signal data as the effective characteristic component.

The effective characteristic component may be a first component in the high-frequency signal data satisfying a specified condition. The specified condition may represent that the similarity coefficient is greater than the similarity coefficient threshold.

The similarity coefficient may be a coefficient for measuring a degree of similarity between the each first component in the high-frequency signal data and the sample signal data. For example, the degree of similarity may be determined by calculating a cosine similarity, a Pearson correlation coefficient, a Jaccard coefficient, or the like.

The similarity coefficient threshold may be a threshold condition related to the similarity coefficient. The similarity coefficient threshold may be preset by the system or artificially. For example, the similarity coefficient threshold may be 0.5.

In some embodiments, the processing module 120 may determine the similarity coefficient threshold based on a threshold determination model. More descriptions regarding the threshold determination model may be found in FIG. 5 and related descriptions thereof.

In some embodiments, the processing module 120 may calculate the similarity coefficient between the each first component in the high-frequency signal data and the original signal one by one by following formulas:

$$\cos_i \alpha = \frac{\left| \sum_{i=1}^{m} HC_i(t) \times H(t) \right|}{\sqrt{\sum_{i=1}^{m} HC_i(t)^2} \times \sqrt{\sum_{i=1}^{m} H(t)^2}};$$

$$R_i = \cos_i \alpha;$$

wherein i represents an iteration round, m represents a count of first components included in the high-frequency signal data, a represents an angle between the high-frequency signal data and the original signal, $HC_i(t)$ represents the high-frequency signal data, $H(t)$ represents the sample signal data of the original signal, and $R_i$ represents the similarity coefficient of the each first component in the high-frequency signal data and the original signal.

In some embodiments, when $\alpha=0°$, $R_i=1$, it represents that the high-frequency signal data is completely similar to the original signal. In some embodiments, when $\alpha=90°$, $R_i=0$, it represents that the high-frequency signal data is not similar to the original signal.

In some embodiments, when $R_i$ is closer to 1, it represents that the high-frequency signal data is more similar to the original signal; when $R_i \in [0, 0.3]$, it represents that the high-frequency signal data is slightly correlated with the original signal; when $R_i \in [0.3, 0.5]$, it represents that the high-frequency signal data is actually correlated with the original signal; when $R_i \in [05, 0.8]$, it represent that the high-frequency signal data is significantly correlated with the original signal; and when $R_i \in [0.8, 1]$, it represents that the high-frequency signal data is highly correlated with the original signal.

In some embodiments, when the similarity coefficient is greater than the similarity coefficient threshold, the processing module 120 may determine the first component corresponding to in the similarity coefficient high-frequency signal data as the effective characteristic component, i.e., the processing module 120 may determine the first component with a similarity coefficient greater than the similarity coefficient threshold as the effective characteristic component.

In some embodiments, the processing module 120 may determine the effective characteristic signal by performing fitting on a plurality of effective characteristic components. The fitting may be linear fitting, polynomial fitting, or the like.

In some embodiments, the processing module 120 may fit each effective characteristic component to the effective characteristic signal by a following formula:

$$H_{new}(t)=[HC_1, HC_2, \ldots, HC_s]$$

wherein $H_{new}(t)$ represents the effective feature signal, $HC_1$, $HC_2$, ..., and $HC_s$ represent the effective feature component, respectively.

The second waveform diagram refers to a waveform diagram of the effective characteristic signal. In some embodiments, the second waveform diagram may be a time-domain waveform diagram of the effective characteristic signal.

The second waveform may be determined in various ways. For example, the processing module 120 may obtain the second waveform diagram by processing the first waveform diagram.

In some embodiments, the processing module 120 may determine the second waveform diagram corresponding to the effective characteristic signal according to the effective characteristic signal.

In some embodiments, the processing module 120 may obtain the second waveform diagram by extracting a corresponding waveform in the first waveform diagram according to the effective characteristic signal.

In 260, whether the urban pipeline leaks may be determined based on the second waveform diagram. In some embodiments, the operation 260 may be performed by the determination module 130.

In some embodiments, the determination module 130 may determine whether the urban pipeline leaks based on the second waveform diagram through a preset determination rule. In some embodiments, the preset determination rule may include: when the waveform of the second waveform diagram is gentle and regular without any abnormal abrupt change, it may represent that the urban pipeline does not leak; and when the waveform of the second waveform diagram has a relatively obvious abrupt change, it may represent that the urban pipeline leaks.

In some embodiments, the determination module 130 may also determine whether a current pipeline leaks based on the second waveform diagram and a standard waveform diagram. For example, when the second waveform diagram deviates from the standard waveform diagram, it may be determined that the current pipeline leaks. The standard waveform diagram refers to a waveform diagram (e.g., a time-domain waveform diagram) corresponding to an original signal generated by a pipeline without leakage.

In 270, in response to that the urban pipeline leaks, a leakage aperture of the urban pipeline may be determined based on the effective characteristic signal. In some embodiments, the operation 270 may be performed by the determination module 130.

The leakage aperture refers to a size and a shape of a leakage location in the pipeline. For example, if the leakage location is equivalent to a circular orifice, the leakage aperture may be a diameter of the leakage circular orifice.

In some embodiments, the determination module 130 may compare the effective characteristic signal with historical effective characteristic signals, and determine a historical leakage aperture corresponding to a historical effective characteristic signal matching the current effective characteristic signal as the current leakage aperture.

In some embodiments, the determination module 130 may obtain characteristic parameters of the effective characteristic signal; and determine the leakage aperture of the urban pipeline by processing the characteristic parameters. More descriptions regarding determining the leakage aperture may be found in FIG. 6 and related descriptions thereof.

In some embodiments of the present disclosure, the combination of high-frequency parts in the original infrasonic signal may be quantitatively determined based on the LCD and the mutual information entropy, which can prevent the signal containing the effective information from being missed. The effectiveness of signal processing may be checked by using the mutual information entropy with the similarity coefficient from the perspective of time, and the effective characteristic signal and the effective time-domain waveform diagram corresponding to the effective characteristic signal may be obtained, thereby improving the effect of denoising the original infrasonic signals. The present disclosure may analyze whether the urban pipeline leaks through the effective time-domain waveform diagram, thereby improving the accuracy of the analysis result.

Figure 3:
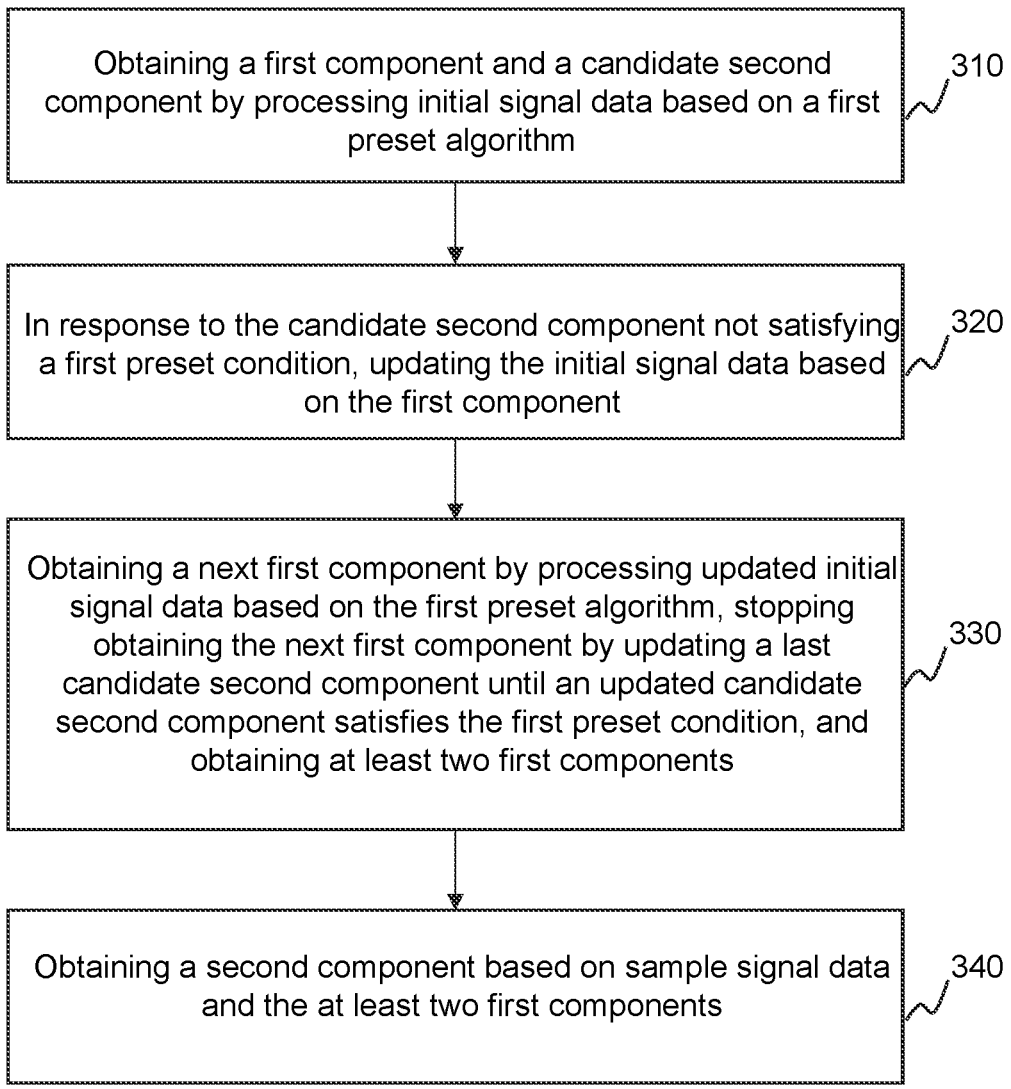
FIG. 3 is a flowchart illustrating exemplary preset iteration operations according to some embodiments of the present disclosure.

FIG. 3 is flowchart illustrating exemplary preset iteration operations according to some embodiments of the present disclosure. As shown in FIG. 3, the process 300 may include the following operations. In some embodiments, the process 300 may be performed by the processing module 120.

In 310: a first component and a candidate second component may be obtained by processing initial signal data based on a first preset algorithm.

In a iteration of a first round, the initial signal data may be sample signal data. In iterations of subsequent rounds, the initial signal data may be updated sample signal data. More descriptions regarding updating the initial signal data may be found below.

The candidate second component refers to a residual component determined during a plurality of execution processes of the first preset algorithm. Only one candidate second component may be obtained in each iteration, and the candidate second component obtained in a last iteration may be a final second component.

The first preset algorithm refers to an algorithm for determining the first component. More descriptions regarding the first preset algorithm may be found in FIG. 4 and related descriptions thereof.

In some embodiments, in each iteration, the processing module 120 may obtain a first component and a candidate second component by processing the initial signal data based on the first preset algorithm.

In 320, in response to the candidate second component not satisfying a first preset condition, the initial signal data may be updated based on the first component.

The first preset condition may be a judgment condition related to the candidate second component. In some embodiments, the first preset condition may be that the candidate second component is a monotonic function (e.g., a strict increasing function, etc.).

In some embodiments, in each iteration, the processing module 120 may separate a first component determined in a current iteration from initial signal data of the current iteration to update the initial signal data.

In some embodiments, in each iteration, the processing module 120 may update the initial signal data based on the first component through following formulas:

$$U_i(t)=H_i(t)-I_i(t)$$

$$H_{i+1}(t)=U_i(t)$$

wherein i represents an iteration round, $U_i(t)$ represents a candidate second component of an iteration of the ith round, $H_i(t)$ represents initial signal data of the iteration of the ith round, $H_{i+1}(t)$ represents initial signal data of an iteration of an (i+1)th round, and $I_i(t)$ represents a first component obtained by the iteration of the ith round.

In 330, a next first component may be obtained by processing updated initial signal data based on the first preset algorithm, the next first component may be stopped to be obtained by updating the last candidate second component until the updated candidate second component satisfies a first preset condition, and at least two first components may be obtained.

In some embodiments, a process for updating the last candidate second component may include replacing the last candidate second component with the candidate second component determined in the current iteration.

In the iteration of the first round, an initial first component and an initial candidate second component may be obtained when the initial signal data is processed based on the first preset algorithm.

In an iteration of a second round, a second first component may be obtained when the updated initial signal data is processed based on the first preset algorithm, and a second candidate second component may be obtained by updating the initial candidate second component.

In an iteration of a nth (last) round, a nth first component may be obtained when the updated initial signal data is processed based on the first preset algorithm, and the second component may be obtained by updating a (n−1)th candidate second component.

In some embodiments, when the updated candidate second component satisfies the first preset condition, the next first component may be stopped to be obtained. For example, when the candidate second component determined in the iteration of the nth round satisfies the first preset condition, the iteration may be stopped, and then the nth first component may be obtained.

In 340, the second component may be obtained based on the sample signal data and the at least two first components.

In some embodiments, the processing module 120 may obtain the second component by stripping all obtained first components from the sample signal data. For example, when the iteration is stopped after the iteration of the nth round and the nth first component is obtained, the processing module 120 may obtain the second component by stripping the obtained n first components from the sample signal data.

In some embodiments, the processing module 120 may obtain the second component based on the sample signal data and the at least two first components (i.e., all the obtained first components) according to a following formula:

$$r_n(t) = H(t) - \sum_{i=1}^{n} I_i(t)$$

wherein $r_n(t)$ represents the second component, n represents a total count of iteration rounds, H(t) represents the sample signal data of the original signal, i represents the iteration round, and $I_i(t)$ represents the first component obtained by the iteration of the ith round.

In some embodiments, the processing module 120 may adaptively decompose the obtained sample signal data using the LCD, and obtain a plurality of first components and a second component after the iterations of n rounds, wherein the first components may be ISCs, and the second component may be a residual component. As the count of iteration rounds increases, the high-frequency signals contained in the ISCs may gradually decrease, and the low-frequency signals may gradually increase. For example, the first component ISC1 obtained for the first time may contain the most high-frequency effective information and may not contain low-frequency noise information, and the first component ISCn obtained for the nth time may contain the most low-frequency noise information and may not contain the high-frequency effective information.

In some embodiments of the present disclosure, new sample signal data may be generated by adjusting a difference between the sample signal data and the first component through continuous iterative updating, so that the first component may contain more effective information on pipeline leakage, thereby further improving the reliability of the subsequent determination of the pipeline leakage.

FIG. 4 is a flowchart illustrating an exemplary first preset algorithm according to some embodiments of the present disclosure. As shown in FIG. 4, the process 400 may include following operations. In some embodiments, the process 400 may be performed by the processing module 120.

In 410, at least one extreme point of the initial signal data and a time corresponding to the extreme point may be determined.

In some embodiments, the processing module 120 may obtain all extreme points and corresponding times thereof in the first waveform diagram of the sample signal data. More descriptions regarding the extreme point may be found in FIG. 2 and related descriptions thereof.

In 420, at least one baseline signal point corresponding to the at least one extreme point may be obtained.

In some embodiments, the processing module 120 may determine a line segment based on two adjacent extreme points, and determine the baseline signal point on the line segment.

In some embodiments, the baseline signal point may be obtained based on a weighted sum of a function value and an extremum at a same specified time, and the weight may be obtained based on a preset. The specified time may be a time corresponding to a minimum point or a maximum point between two adjacent maximum points or between two adjacent minimum points, and the function value may be a value on the line segment at the specified time.

In some embodiments, the processing module 120 may obtain the baseline signal point by determining all the extreme points of the original signal and performing a linear interpolation operation on each of the extreme points. For example, the baseline signal point may be obtained by performing the linear interpolation operation on an extreme point $(T_k, X_k)$ and an extreme point $(T_{k+1}, X_{k+1})$.

In some embodiments, the processing module 120 may determine the baseline signal point corresponding to the at least one extreme point by a following formula:

$$L_{k+1} = \alpha A_{k+1} + (1-\alpha) X_{k+1}$$

wherein $X_{k+1}$ represents a (k+1)th extreme point of the original signal, a represents a constant parameter, $A_{k+1}$ represents a function value reflecting a relationship between the extreme point $X_{k+1}$ and the time $T_{k+1}$, and $L_{k+1}$ represents a baseline signal point corresponding to the extreme point $X_{k+1}$.

In some embodiments, $A_{k+1}$ may be determined by a following formula:

$$A_{k+1} = X_k + \frac{T_{k+1} - T_k}{T_{k+2} - T_k}(X_{k+2} - X_k)$$

wherein $T_{k+1}$ represents the time corresponding to the extreme point $X_{k+1}$, $X_{k+2}$ represents a (k+2)th extreme point of the original signal, $T_{k+2}$ represents a time corresponding to the extreme point $X_{k+2}$, and $X_k$ represents a kth extreme point of the original signal.

In 430, a baseline signal may be obtained by processing the at least one baseline signal point.

The baseline signal may be a signal segment relative to the baseline signal point. For example, the baseline signal may be a signal segment formed by fitting part of the baseline signal points, and the part of the baseline signal points may be two adjacent baseline signal points or one or more random baseline signal points. A baseline signal may be obtained in each iteration.

The baseline signal may be determined in various ways. In some embodiments, the processing module 120 may obtain the baseline signal by fitting the at least one baseline signal point using fitting software. The fitting software may be MATLAB or other fitting software.

In some embodiments, the processing module 120 may also divide the sample signal data into a plurality of intervals based on all the extreme points of the sample signal data and the corresponding times thereof. The intervals may be obtained based on segmentation between any two adjacent extreme points. The processing module 120 may obtain signal segments by linearly transforming the signals in each interval, and obtain the baseline signal by connecting each signal segment.

In 440, a candidate first component may be obtained based on the baseline signal and the initial signal data.

The candidate first component may be a first component that needs to be determined. For example, when the candidate first component satisfies a second preset condition, the candidate first component may be determined as the first component. More descriptions regarding the second preset condition may be found in the related descriptions of 450.

In some embodiments, the processing module 120 may obtain the candidate first component based on an signal operation of the initial signal data and the baseline signal. The signal operation may include any one or combination of signal addition, subtraction, and multiplication.

In some embodiments, in each iteration, the processing module 120 may obtain the candidate first component by separating the baseline signal from the initial signal data.

In some embodiments, in each iteration, the processing module 120 may determine the candidate first component corresponding to the iteration based on the baseline signal and the initial signal data through a following formula:

$$G_i(t)=H_i(t)-L_i(t)$$

wherein i represents the iteration round, $G_i(t)$ represents a candidate first component obtained by an iteration of the ith round, $L_i(t)$ represents a baseline signal obtained by the iteration of the ith round, and $H_i(t)$ represents initial signal data of the iteration of the ith round.

In 450: in response to the candidate first component not satisfying the second preset condition, the candidate first component may be used as the initial signal data, and the above operations may be repeated.

The second preset condition may be a condition that the candidate first components need to satisfy. The second preset condition may be related to the first preset algorithm. In some embodiments, when the first preset algorithm is LCD, the second preset condition may include: in the sample signal data of the original signal, the maximum value may be positive, the minimum value may be negative, any two adjacent maximum value and minimum value may be strictly monotonic, and a ratio of the function value $A_{k+1}$ at the time $T_{k+1}$ to $X_{k+1}$ may remain the same, i.e., $\alpha A_{k+1}+(1-\alpha)X_{k+1}=0$, wherein the time $T_{k+1}$ corresponds to a line segment obtained by connecting any two adjacent maximum points or any two adjacent minimum points.

In some embodiments, when the processing module 120 judges that the candidate first component does not satisfy the second preset condition, the candidate first component may be used as the initial signal data, at least one extreme point of updated initial signal data and a time corresponding to the extreme point may be determined, and a next baseline signal and a next candidate first component may be obtained. When the candidate first component does not satisfy the second preset condition, the above operations 410-440 may be continuously repeated.

In 460, in response to the candidate first component satisfying the second preset condition, the first component may be obtained.

In some embodiments, when the processing module 120 judges that the candidate first component satisfies the second preset condition, the candidate first component may be determined as the first component. In the iteration of the first round, the initial first component may be obtained based on the first preset algorithm. In the iterations of the subsequent rounds, one first component may be obtained based on the first preset algorithm in each iteration, until an iteration end condition of the preset iteration operations is satisfied. More descriptions regarding the preset iteration operations may be found in FIG. 3 and related descriptions thereof.

In some embodiments of the present disclosure, the first component may be obtained based on the second preset condition, the smoothness and symmetry of the waveform of the obtained first component may be guaranteed, and the monotonicity may be satisfied between any two adjacent extreme points, making the first component have physical meaning, thereby facilitating the subsequent characteristic extraction of the infrasonic signals.

It should be noted that, the above descriptions about the processes 200-400 are for illustration and description purposes only, and do not limit the scope of application of the present disclosure. For those skilled in the art, various modifications and variations may be made to the processes 200 400 under the guidance of the present disclosure. However, such modifications and variations are still within the scope of the present disclosure.

Figure 5:
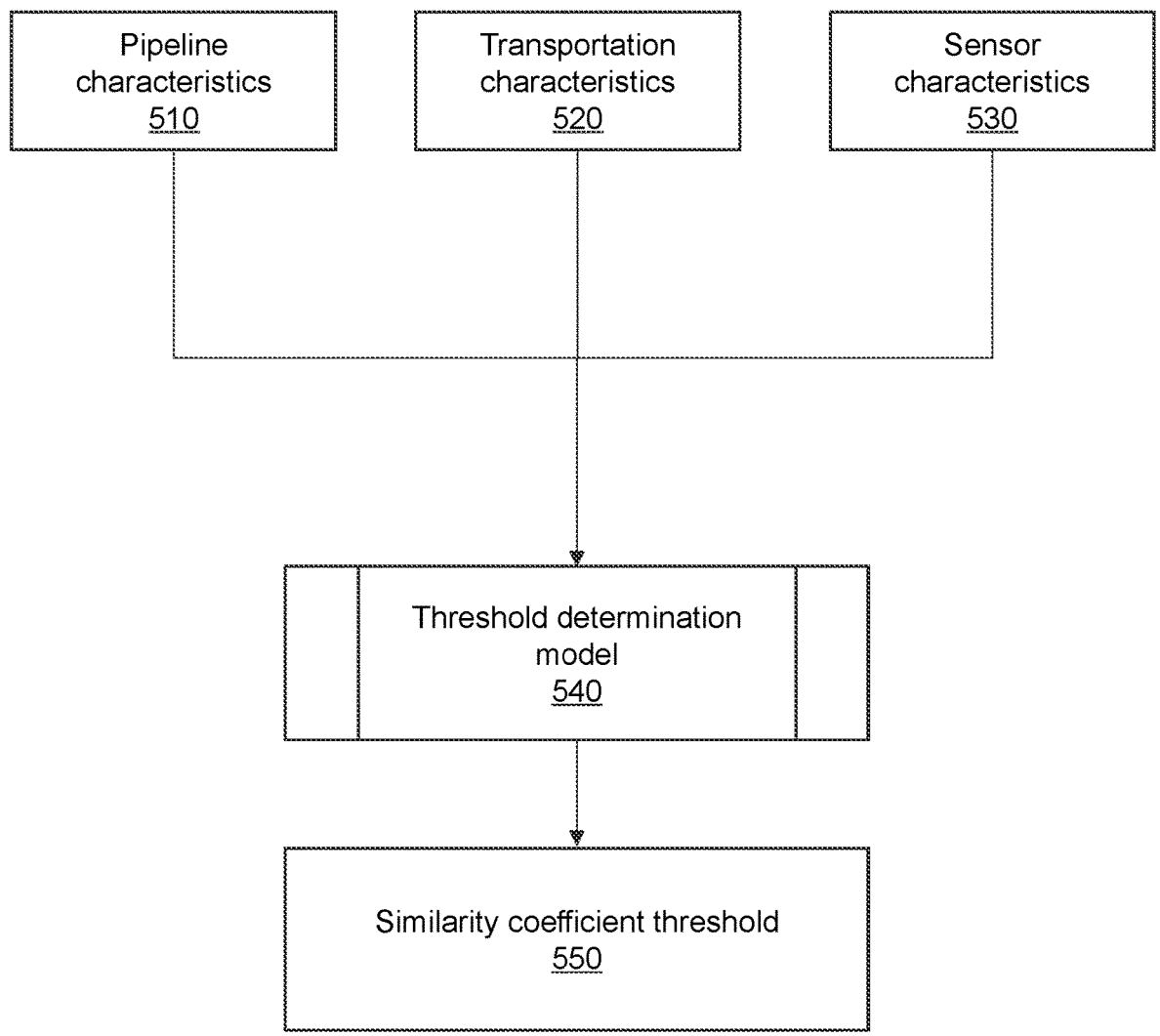
FIG. 5 is a schematic diagram illustrating an exemplary threshold determination model according to some embodiments of the present disclosure.

FIG. 5 is schematic diagram illustrating an exemplary threshold determination model according to some embodiments of the present disclosure.

In some embodiments, the processing module 120 may determine a similarity coefficient threshold 550 by processing pipeline characteristics 510, transportation characteristics 520, and sensor characteristics 530 of an urban pipeline based on a threshold determination model 540, wherein the threshold determination model may be a machine learning model, such as a neural network model, a deep neural network model, or the like, or any combination thereof.

In some embodiments, an input of the threshold determination model 540 may include the pipeline characteristics 510, the transportation characteristics 520, the sensor characteristics 530, etc., and an output of the threshold determination model 540 may include the similarity coefficient threshold 550.

The pipeline characteristics may be parameter characteristics of a pipeline. For example, the pipeline characteristics may include a material, an inner diameter, an outer diameter, etc., of the pipeline. The pipeline characteristics may be obtained from a pipeline manufacturer or by actual measurement.

The transportation characteristics may be characteristics related to pipeline transportation. For example, the transportation characteristics may include information such as a type of a transport substance (e.g., gas or liquid), a density, a flow rate, a pressure, or the like. The transportation characteristics may be obtained according to a detection device (e.g., a density sensor, a flow rate sensor, a gas pressure sensor, etc.) installed in the pipeline.

The sensor characteristics may be characteristics related to a data collection process of a sensor. For example, the sensor characteristics may include a sensor accuracy, a collection frequency, or the like. The sensor characteristics may be obtained from a sensor manufacturer or based on a transport test on the pipeline.

In some embodiments, the threshold determination model may be trained based on a plurality of first training samples with first labels. For example, the plurality of first training samples with the first labels may be input into an initial threshold determination model, a loss function may be constructed by using the first labels and results of the initial threshold determination model, and parameters of the initial threshold determination model may be iteratively updated based on the loss function by gradient descent or other manners. When a preset condition is met, the model training may be completed, and a trained threshold determination model may be obtained. The preset condition may be that the loss function converges, the count of iteration rounds reaches a threshold, or the like.

In some embodiments, the first training samples may include a plurality of sets of sample pipeline characteristics, sample transportation characteristics, and sample sensor characteristics, and the first labels may be the similarity coefficient threshold.

In some embodiments, the first training samples may be determined based on historical data. For example, the historically obtained pipeline characteristics, historically obtained transportation characteristics, and historically obtained sensor characteristics may be used as the first training samples. In some embodiments, the first labels may be obtained based on experiments. For a certain first training sample (including a certain historical pipeline characteristic, certain historical transportation characteristic, and certain historical sensor characteristic), a plurality of waveform diagrams of a plurality of effective characteristic signals obtained by the first training samples under a large number of different reference similarity thresholds may be determined, the respective prediction accuracies of the plurality of waveform diagrams may be determined. Further, the reference similarity threshold corresponding to the waveform diagram with the highest prediction accuracy may be determined as the first label. When a certain waveform diagram reflects the leakage of the pipeline and the pipeline actually leaks, the prediction accuracy may be relatively high, or the prediction accuracy may be relatively low.

In some embodiments of the present disclosure, determining the similarity coefficient threshold based on the threshold determination model may obtain a better effect than directly determining the similarity coefficient threshold based on empirical presets, which can improve the reliability of determination and save manpower and time resources for subsequent determination of the relationship between the high-frequency signal data and the sample signal data.

FIG. 6 is flowchart illustrating an exemplary process for determining a leakage aperture of an urban pipeline according to some embodiments of the present disclosure. As shown in FIG. 6, the process 600 may include following operations. In some embodiments, the process 600 may be performed by a determination module 130.

In 610, characteristic parameters of an effective characteristic signal may be obtained.

The characteristic parameters refer to parameters related to the effective characteristic signal. For example, the characteristic parameters may include a frequency, a period, an amplitude, a peak-to-peak value, an average value, etc.

The characteristic parameters may be obtained in various ways. For example, the characteristic parameters of the effective characteristic signal may be obtained by performing Fourier transform, wavelet transform, Hilbert-Huang transform, and other processing on the effective characteristic signal.

In some embodiments, the characteristic parameters may include an average peak value and a mean square amplitude of the effective characteristic signal. When the urban pipeline is under pressure, a leakage aperture of the urban pipeline may change. In addition, as an original signal is a time-ordered and correlated time-domain signal, the amplitude and peak value of the effective characteristic signal may also change accordingly. Correspondingly, in some embodiments, when the leakage of the urban pipeline is determined, the average peak value and the mean square amplitude of the effective characteristic signal may be calculated by following formulas:

$$H_{am} = \frac{1}{N}\sum_{t=0}^{N}|H_{new}(t)|$$

-continued $$H_{rms} = \sqrt{\frac{1}{N}\sum_{t=0}^{N-1}(H_{new}(t) - \bar{x})^2}$$

wherein N denotes a length of the effective feature signal, $H_{new}(t)$ represents the effective feature signal, $\bar{x}$ represents the average value of the effective feature signal, $H_{am}$ denotes the average peak value of the effective feature signal, and $H_{rms}$ denotes the mean square amplitude of the effective feature signal.

In 620, the leakage aperture of the urban pipeline may be determined by processing the characteristic parameters.

In some embodiments, the determination module 130 may determine the leakage aperture of the urban pipeline by processing the characteristic parameters based on a second preset algorithm. In some embodiments, the second preset algorithm may include a model or various data analysis algorithms, such as a statistical analysis manner, or the like.

In some embodiments, the determination module 130 may determine the leakage aperture of the urban pipeline by processing the characteristic parameters based on a preset aperture function.

In some embodiments, the preset aperture function may be as follows:

$$f(s) = \frac{H_{rms}}{H_{am}} = b_1 s^4 + b_2 s^3 + b_3 s^2 + b_4 s + b_5$$

wherein $f(s)$ represents the aperture function, s represents the leakage aperture, and $b_1$-$b_5$ represent parameters of the aperture function.

In some embodiments, the preset aperture function may be as follows:

$$f(s) = H_{rms} = b_1 s^4 + b_2 s^3 + b_3 s^2 + b_4 s + b_5$$

wherein $f(s)$ represents the aperture function, s represents the leakage aperture, and $b_1$-$b_5$ represent parameters of the aperture function.

In some embodiments, the preset aperture function may be as follows:

$$f(s) = H_{am} = b_1 s^4 + b_2 s^3 + b_3 s^2 + b_4 s + b_5$$

wherein $f(s)$ represents the aperture function, s represents the leakage aperture, and $b_1$-$b_5$ represent parameters of the aperture function.

In some embodiments, the leakage aperture may be calculated by fitting the parameters of the aperture function described in some embodiments of the present disclosure by software. The software may be MATLAB software or other software.

After analyzing actual application data, it is found that the MATLAB software has the best effect of fitting the following parameters of the aperture function:

$$f(s) = \frac{H_{rms}}{H_{am}} = b_1 s^4 + b_2 s^3 + b_3 s^2 + b_4 s + b_5$$

In some embodiments, the determination module 130 may determine a leakage probability and the leakage aperture of the urban pipeline by processing the pipeline characteristics, the transportation characteristics, and the second waveform diagram of the urban pipeline based on the judgment model.

The judgment model may be a machine learning model. In some embodiments, the judgment model may include any one or combination of various feasible models such as a recurrent neural network (RNN) model, a deep neural network (DNN) model, a convolutional neural network (CNN) model, etc.

In some embodiments, an input of the judgment model may include the pipeline characteristics, the transportation characteristics, the second waveform diagram, etc., and an output of the judgment model may include the leakage aperture of the urban pipeline. More descriptions regarding the pipeline characteristics, the transportation characteristics, and the second waveform diagram may be found in FIG. 2, FIG. 5, and related descriptions thereof.

In some embodiments, the input of the judgment model may also include a pipeline network branch complexity. The pipeline network branch complexity may represent a complexity of urban pipelines. The pipeline network branch complexity may be represented by a numerical value, and the larger the numerical value, the higher the complexity.

In some embodiments, the pipeline network branch complexity may be determined according to a count of pipeline branches from one signal collector to another signal collector, and the two signal collectors may be adjacent or not adjacent. For example, the count of passed pipeline branches may be determined as the pipeline network branch complexity.

In some embodiments, the output of the judgment model may also include the leakage probability of the urban pipeline.

In some embodiments, the output of the judgment model may be expressed in a vector form. For example, the output of the judgment model may be expressed as (a, b) or [(a1, b1), (a2, b2), ... )], where a, a1, and a2 represent the leakage aperture, respectively, and b, b1, and b2 represent the leakage probability corresponding to each leakage aperture, respectively.

In some embodiments, the judgment model may be obtained by training based on a plurality of second training samples with second labels. For example, the plurality of second training samples with the second labels may be input into an initial judgment model, a loss function may be constructed through the second labels and results of the initial judgment model, and parameters of the initial judgment model may be iteratively updated by gradient descent or other manners based on the loss function. When a preset condition is met, the model training may be completed, and the trained judgment model may be obtained. The preset condition may be that the loss function converges, the count of iteration rounds reaches a threshold, or the like.

In some embodiments, the second training samples may include a plurality of sets of sample pipeline characteristics, sample transportation characteristics, and sample second waveform diagrams of sample urban pipelines. In some embodiments, the second training samples may also include a plurality of pipeline network branch complexities of the sample urban pipelines.

In some embodiments, the second labels may be the leakage apertures of the sample urban pipelines. In some embodiments, the second labels may also include leakage probabilities corresponding to the leakage apertures of the sample urban pipelines.

In some embodiments, the second training samples may be determined based on historical data. For example, the pipeline characteristics, the transportation characteristics, and the second waveform diagrams obtained based on the historical data may be used as the second training samples.

In some embodiments, the second labels may be obtained based on manual labeling. For a certain second training sample (including a certain historical pipeline characteristic, historical transportation characteristic, and historical second waveform diagram), an actual leakage aperture may be manually labeled as the second label of the second training sample.

In some embodiments of the present disclosure, the leakage probability and the leakage aperture of the urban pipeline may be determined by processing the pipeline characteristics, the transportation characteristics, and the second waveform diagram of the urban pipeline through the judgment model, and the leakage probability and the leakage aperture may be predicted using learnable parameters, and thus a more accurate leakage aperture can be obtained through training.

In one or more embodiments of the present disclosure, when the leakage aperture of the urban pipeline is determined, the characteristic parameters of the effective characteristic signal may be considered, so that the accuracy of leakage aperture prediction can be improved, and the leakage pipeline can be positioned in time.

Taking processing the original infrasonic signal using LCD as an example, some embodiments of the present disclosure can be understood with reference to the following content, but the following description is only an exemplary description of some embodiments, and does not constitute a limitation to the embodiments.

Figure 7:
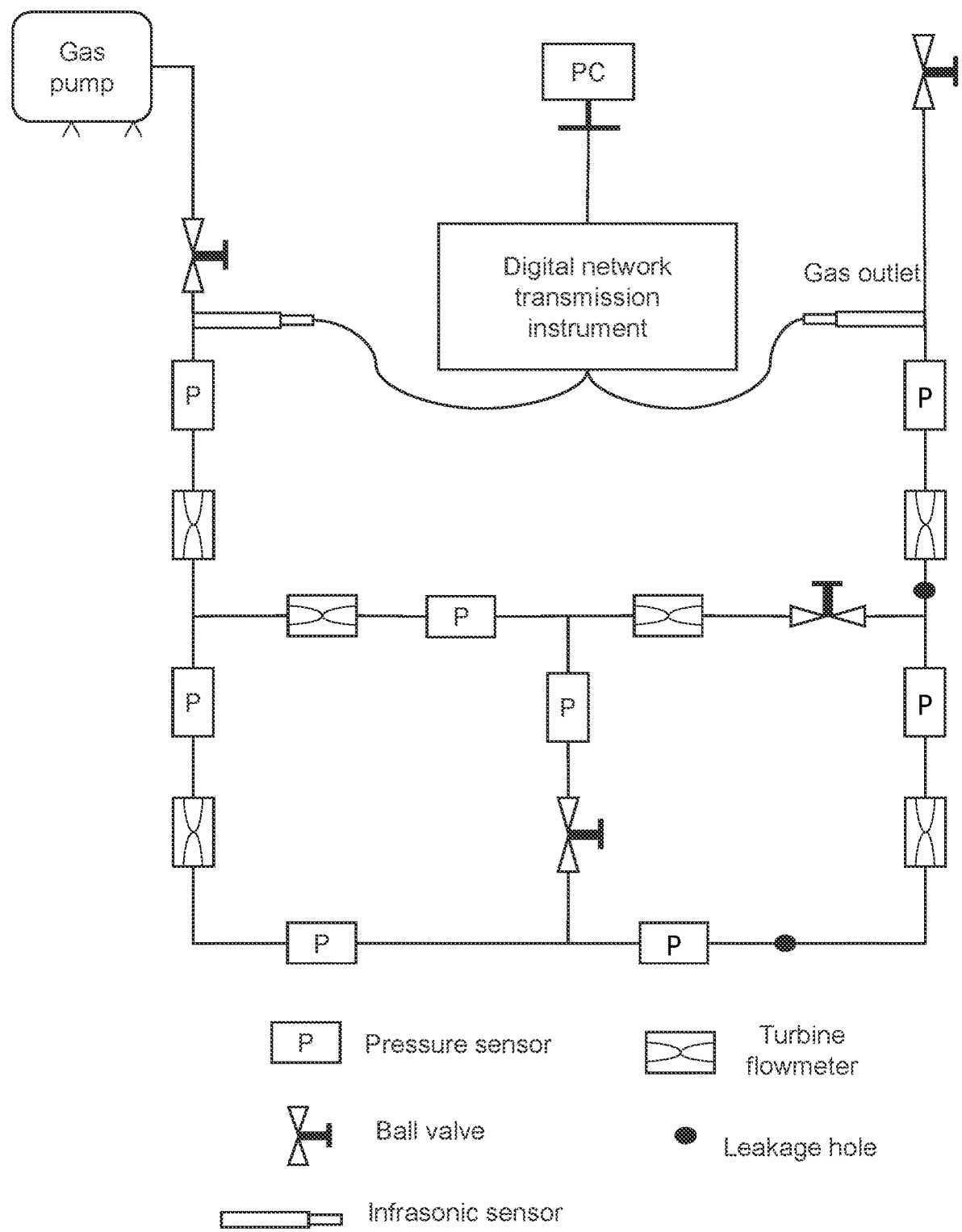
FIG. 7 is a schematic diagram illustrating an exemplary experimental device of a simulation experiment according to some embodiments of the present disclosure.

In some embodiments, referring to FIG. 7, an experimental device used in this embodiment may include buried non-metallic urban pipelines and related instruments and meters. The instruments and meters may include a pressure sensor, a ball valve, a gas pump, a turbine flowmeter, a computer, a digital network transmission instrument, an infrasonic wave collection sensor, etc. The buried non-metallic urban pipelines may include a U-shaped main pipeline and two branch pipelines. Leakage holes may be respectively set on the U-shaped main pipeline and the branch pipelines, and the leakage apertures may be adjusted. Under the pressure condition of 0.3 MPa, the urban pipelines with leakage apertures of 1 mm, 2 mm, 3 mm and 4 mm may be simulated respectively.

Figure 8:
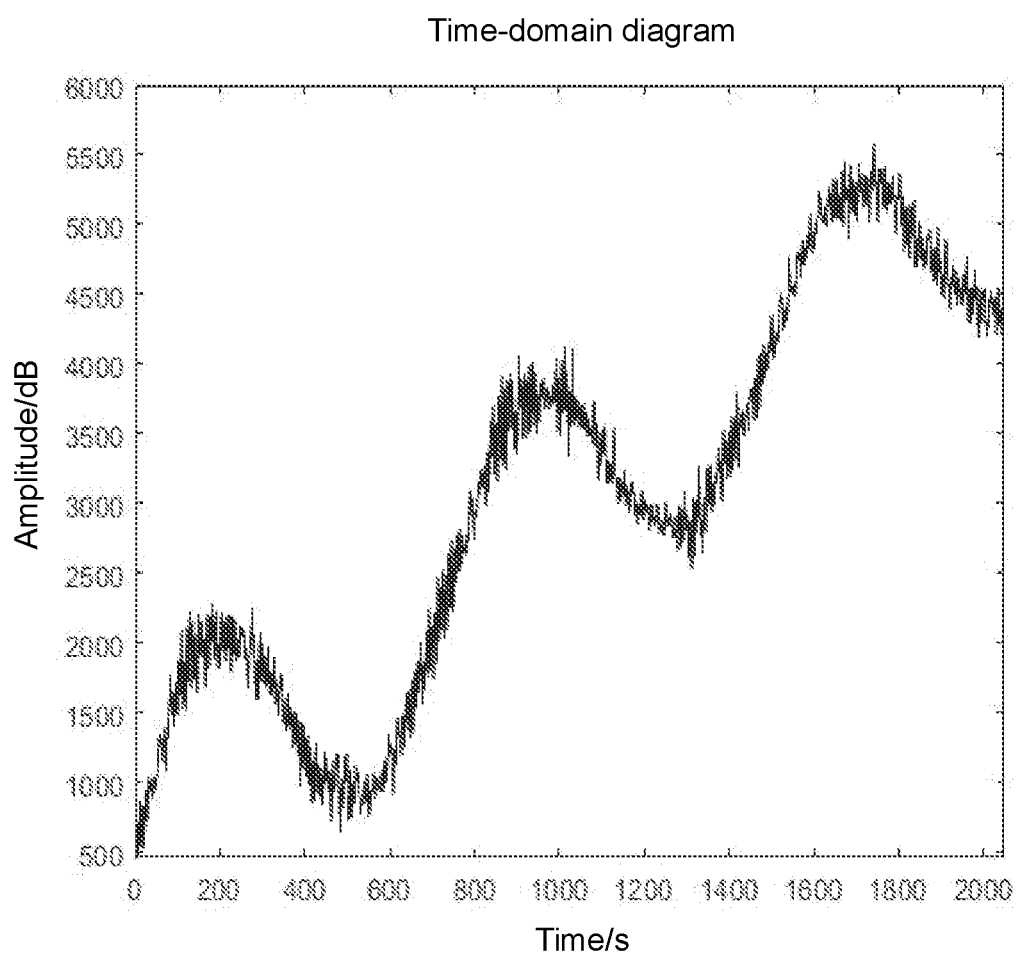
FIG. 8 is a time-domain waveform diagram illustrating an urban pipeline with a leakage aperture of 4 mm according to some embodiments of the present disclosure.

FIG. 8 is a time-domain waveform diagram illustrating an urban pipeline with a leakage aperture of 4 mm. Due to factors such as noise caused by the experimental instruments and experimental sites, the waveform of the time-domain waveform diagram may be messy, and no obvious characteristics may be observed from the time-domain waveform diagram, and thus whether the urban pipeline leaks may not be determined.

Therefore, this embodiment may analyze the sample signal data and the corresponding time-domain waveform diagram of an infrasonic original signal of the urban pipeline with the leakage aperture of 4 mm through following operations.

Figure 9:
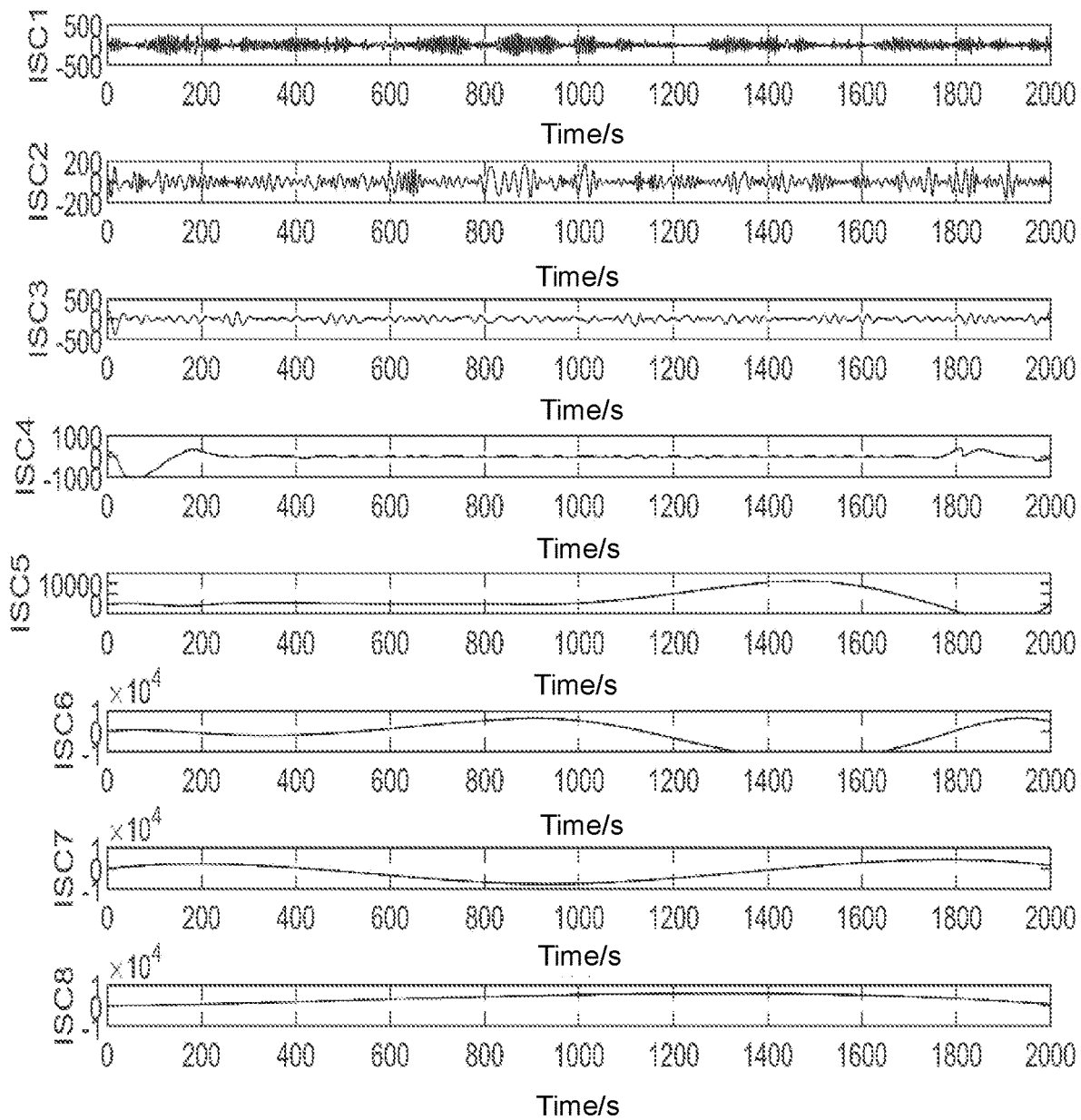
FIG. 9 is a schematic diagram illustrating 8 intrinsic scale components (ISCs) of the urban pipeline with the leakage aperture of 4 mm according to some embodiments of the present disclosure.

S1, 8 ISCs and a residual component may be obtained by adaptively decomposing an obtained infrasonic original signal using the LCD, referring to FIG. 9.

S2, a mutual information entropy between adjacent ISCs may be calculated (see Table 1), and high-frequency signal data may be obtained by determining a high-frequency part of the original infrasonic signal using the mutual information entropy.

In practical application, it can be seen from Table 1 that both $ISC_{34}$ and $ISC_{56}$ are local minimum points. According to the order of ISCs, $ISC_{34}$ is the first local minimum point, so $ISC_{34}$ is a demarcation point between a high-frequency part and a low-frequency part of the original infrasonic signal, and thus the high-frequency signal components $ISC_1$, $ISC_2$, $ISC_3$, and $ISC_4$ are retained, the low-frequency signal components $ISC_5$, $ISC_6$, $ISC_7$, and $ISC_8$ are removed, and the high-frequency signal data $HC_4(t)$ ($ISC_1+ISC_2+ISC_3+ISC_4$) is obtained.

TABLE 1

| | ISC | | | | | | |
|---|---|---|---|---|---|---|---|
| | $ISC_{12}$ | $ISC_{23}$ | $ISC_{34}$ | $ISC_{45}$ | $ISC_{56}$ | $ISC_{67}$ | $ISC_{78}$ |
| Mutual information entropy | 0.784 | 0.867 | 0.457 | 0.612 | 0.231 | 0.788 | 1.010 |

S3, a similarity coefficient between the high-frequency signal data and the original infrasound signal may be calculated, and the effective characteristic signal and a effective time-domain waveform diagram corresponding to the effective characteristic signal may be obtained by extracting the effective characteristic components from the combination of high-frequency parts according to the similarity coefficient.

In the application, the similarity coefficient may be calculated by a following formula:

$$R_i = \cos_i\alpha = \frac{|400.71 \times 466.46 + 302.71 \times 433.01 + \ldots + 4217.87 \times 4573.86|}{\sqrt{400.71^2 + 302.71^2 + \ldots + 4217.87^2} \times \sqrt{466.46^2 + 433.01^2 + \ldots + 4573.86^2}}$$

$$= 0.843$$

Figure 10:
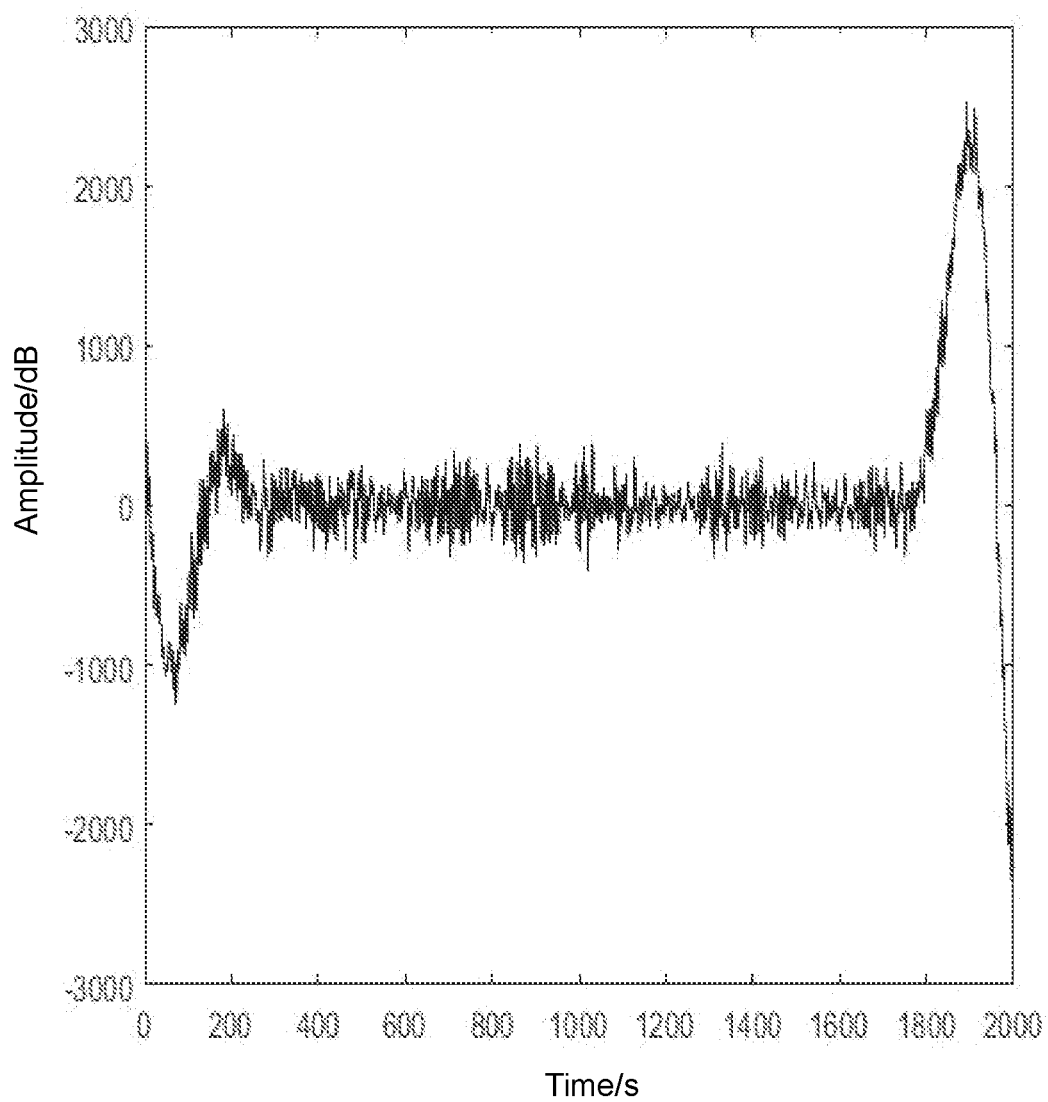
FIG. 10 is an effective time-domain waveform diagram illustrating the urban pipeline with the leakage aperture of 4 mm according to some embodiments of the present disclosure.

Taking a similarity coefficient threshold of 0.5 as an example, when the similarity coefficient is greater than 0.5, and the corresponding ISC in the high-frequency signal data is recorded as the effective characteristic component, the effective characteristic signal $H_{new}(t)$ ([ISC1, ISC2, ISC3, ISC4]) may be determined, and the corresponding effective time-domain waveform is shown in FIG. 10.

S4, whether the urban pipeline leaks may be determined using the effective time-domain waveform diagram. It can be seen from FIG. 10 that an obvious abrupt change occurs in the waveform at about 1800s, indicating that the urban pipeline has leakage. Therefore, an average peak and a mean square amplitude of the effective characteristic signal may be calculated by following formulas, and see Table 2 for details.

$$H_{am} = \frac{1}{2048} \times (400.71 + 302.72 + \ldots + 4217.87) = 309.81$$

$$H_{rms} = \sqrt{\frac{1}{2048} \times \frac{(400.71 - 49.41) + (302.71 - 49.41)2 + \ldots + (4217.87 - 9.41)}{}} = 619.29$$

TABLE 2

Characteristic parameters of different apertures under a pressure of 0.3 MPa

| Leakage aperture (mm) | Average peak (mm) | Mean square amplitude (mm) |
|---|---|---|
| 1 | 834.24 | 1506.86 |
| 2 | 177.96 | 313.16 |
| 3 | 99.08 | 150.56 |
| 4 | 309.81 | 619.29 |

S5, the leakage aperture of the urban pipeline may be analyzed according to the average peak value, the mean square amplitude, and a following aperture function, see Table 2 for details, wherein the parameters of the aperture function may be fitted by MATLAB software.

$$f(s) = \frac{H_{rms}}{H_{am}} = 0.05854s^4 - 0.3062s^3 - 0.001042s^2 + 1.724s - 3.154 \times e^{-15}$$

TABLE 3

Identification of different leakage apertures

| Leakage aperture (mm) | Average peak (mm) | Mean square amplitude (mm) | Calculated leakage aperture (mm) | Relative error (%) |
|---|---|---|---|---|
| 1 | 4455.48 | 5076.89 | 0.72 | 28.03 |
| 2 | 3196.43 | 6162.41 | 1.76 | 12.00 |
| 3 | 1020.06 | 1891.01 | 3.77 | 7.67 |
| 4 | 597.61 | 1519.67 | 4.14 | 3.50 |

In practical application, the accuracy of the parameters of the aperture function may be determined using sum of squares for error (SSE) and the goodness of fit. The SSE may be the sum of squares for an error between the fitting data and the corresponding points of the original data, and the more the value of the SSE tends to 0, the better the fitting effect. The goodness of fit R-square may be to characterize the quality of fitting through the change of the data. The value range of the goodness of fit may be [0, 1], and the more the value tends to 1, the better the fitting effect. Fitting the parameters of the aperture function in S5 by MATLAB software may obtain the SSE of 0.46 and the goodness of fit R-square of 0.8892, representing that the parameter fitting effect of the aperture function may be relatively good.

One or more embodiments of the present disclosure further provide a non-transitory computer-readable storage medium storing computer instructions. When reading the computer instructions in the storage medium, a computer may perform the method for leakage analysis of the urban pipeline of any one of the embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for leakage analysis of an urban pipeline based on local characteristic scale decomposition (LCD), comprising:
   obtaining sample data and a corresponding time-domain waveform diagram of an infrasonic original signal of the urban pipeline;
   obtaining several intrinsic scale components (ISCs) and a residual component by adaptively decomposing the infrasonic original signal using the LCD;
   calculating a mutual information entropy between adjacent ISCs, and obtaining a combination of high-frequency parts by determining a high-frequency part of the original infrasonic signal using the mutual information entropy;
   calculating a similarity coefficient between the combination of high-frequency parts and the original infrasound signal, and obtaining an effective characteristic signal and an effective time-domain waveform diagram by extracting an effective characteristic component from the combination of high-frequency parts according to the similarity coefficient;
   determining whether the urban pipeline leaks using the effective time-domain waveform diagram, and if the urban pipeline leaks, extracting an average peak value and a mean square amplitude of the effective characteristic signal, and analyzing a leakage aperture of the urban pipeline according to the average peak value, the mean square amplitude, and a preset aperture function, wherein the leakage aperture refers to a size and a shape of a leakage location in the urban pipeline; wherein
   the determining whether the urban pipeline leaks using the effective time-domain waveform diagram includes:
   determining a leakage probability and the leakage aperture of the urban pipeline by processing pipeline characteristics, transportation characteristics, and the effective time-domain waveform diagram of the urban pipeline based on a judgment model, wherein the judgment model is a machine learning model, the judgment model is obtained by training based on a plurality of second training samples with second labels, the second training samples include a plurality of sets of sample pipeline characteristics, sample transportation characteristics, and sample effective time-domain waveform diagrams of sample urban pipelines, and the second labels include leakage apertures of the sample urban pipelines;
   a training process of the judgement model includes:
      inputting the plurality of second training samples with the second labels into an initial judgment model;
      constructing a second loss function through the second labels and results of the initial judgment model;
      iteratively updating parameters of the initial judgment model by gradient descent based on the second loss function; and
      in response to a second preset condition being met, completing the training process, and obtaining the judgment model, wherein the second preset condition refers to the second loss function converging or a count of iteration rounds reaching a second threshold;
   generating an emergency repair plan based on the leakage aperture; and repairing the urban pipeline at the leakage location based on the emergency repair plan.

2. The method of claim 1, wherein the obtaining several intrinsic scale components (ISCs) and a residual component by adaptively decomposing the infrasonic original signal using the LCD includes:
iterating following operations in a loop until a residual quantity is a monotonic function, then terminating an iterative process and updating the infrasonic original signal using a following formula:

$$X(t)=\Sigma_{i=1}^{n}ISC_i+r_n(t),$$

wherein X(t) represents the infrasonic original signal, $ISC_i$ represents an ith ISC component, $r_n(t)$ represents a residual component, and n represents a total count of iteration rounds;
performing an iteration operation I, in response to determining that a maximum value and a minimum value of the infrasonic original signal satisfy a restriction strategy I, and obtaining an ISC component using a following formula and terminating the iteration operation I:

$$ISC_i=I_i(t);$$

wherein $I_i(t)$ represents an ith residual component;
stripping the $ISC_i$ component from the infrasonic original signal, and updating the infrasonic original signal using a following formula:

$$U_i(t)=X(t)-ISC_i,X(t)=U_i(t),$$

wherein $U_i(t)$ represents an ith residual quantity;
the iteration operation I includes:
obtaining a baseline signal point using a following formula:

$$A_{k+1} = X_k + \frac{T_{k+1} - T_k}{T_{k+2} - T_k}(X_{k+2} - X_k),$$

$L_k=aA_k+(1-a)X_k$; wherein $X_k$ represents a kth extreme point of the infrasonic original signal, a represents a constant parameter, $A_{k+1}$ represents a function value of a time Tk corresponding to the extreme point $X_k$, and $L_k$ represents a baseline signal point corresponding to the extreme point $X_k$;
obtaining a baseline signal of the infrasonic original signal by fitting the baseline signal point using MATLAB software, and obtaining the residual component by separating the baseline signal from the infrasonic original signal;
$I_i(t)=X(t)-L(t)$; wherein L(t) represents the baseline signal, and X(t) represents the infrasonic original signal;
the restriction strategy I includes:
in the infrasonic original signal, the maximum value being positive, the minimum value being negative, any two adjacent maximum value and minimum value being strictly monotonic, and a function value of a time $T_{k+1}$ corresponding to a connection line between any two adjacent maximum value and minimum value satisfies a following formula:

$$aA_{k+1}+(1-a)X_{k+1}=0;$$

wherein $X_{k+1}$ represents a (k+1) extreme point of the infrasonic original signal.

3. The method of claim 2, wherein the calculating a mutual information entropy between adjacent ISCs, and obtaining a combination of high-frequency parts by determining a high-frequency part of the original infrasonic signal using the mutual information entropy includes:
calculating the mutual information entropy between the adjacent ISCs using a following formula:

$$P(ISC_i; ISC_{i+1}) =$$
$$-\int\int_{ISC_{i+1} ISC_i} p(ISC_i, ISC_{i+1})\log\frac{p(ISC_i, ISC_{i+1})}{p(ISC_i)p(ISC_{i+1})}dISC_i dISC_{i+1};$$

wherein $p(ISC_i)$ and $p(ISC_{i+1})$ represent a marginal probability distribution of two adjacent ISC components, and $p(ISC_i, ISC_{i+1})$ represents a joint probability distribution of the two adjacent ISC components;
using a first local minimum value in the mutual information entropy as a dividing line to distinguish the high-frequency part and a low-frequency part of the infrasonic original signal, and obtaining the combination of high-frequency parts by a following formula:

$$HC_z(t) = \sum_{i=1}^{Z} ISC_i;$$

wherein $HC_z(t)$ represents the combination of high-frequency parts, Z represents a positive integer less than n, a mutual information entropy between $ISC_{Z-1}$ and $ISC_Z$ is the first local minimum value, $ISC_{Z-1}$ represents a (Z−1)th ISC component, and $ISC_Z$ represents a Zth ISC component.

4. The method of claim 1, wherein the calculating a similarity coefficient between the combination of high-frequency parts and the original infrasound signal, and obtaining the effective characteristic signal and an effective time-domain waveform diagram by extracting the effective characteristic component from the combination of high-frequency parts according to the similarity coefficient includes:
calculating a similarity coefficient between each ISC component in the combination of high-frequency parts and the infrasonic original signal one by one by following formulas:

$$\cos_i\alpha = \frac{\left|\sum_{i=1}^{m} HC_i(t) \times H(t)\right|}{\sqrt{\sum_{i=1}^{m} HC_i(t)^2} \times \sqrt{\sum_{i=1}^{m} H(t)^2}}$$

$$R_i = \cos_i\alpha$$

wherein i represents an iteration round, m represents a count of first components included in high-frequency signal data, α represents an angle between the combination of high-frequency parts and the infrasonic original signal, HC(i) represents the high-frequency signal data, $R_i$ represents the similarity coefficient between the combination of high-frequency parts and the infrasonic original signal, and X(t) represents the infrasonic original signal;
determining a magnitude of the similarity coefficient: when the similarity coefficient is greater than 0.5, determining the ISC component corresponding to the similarity coefficient in the combination of high-frequency parts as the effective characteristic component;

fitting each effective characteristic component to the effective characteristic signal by a following formula:

$$X_{new}(t)=[HC_1,HC_2,\ldots,HC_s]$$

wherein $X_{new}(t)$ represents the effective characteristic signal, HCs represent the effective characteristic component; and obtaining the effective time-domain waveform diagram by extracting a corresponding waveform in the time-domain waveform diagram according to the effective characteristic signal.

5. The method of claim 4, wherein a process of determining the effective characteristic component further includes:

in response to the similarity coefficient being greater than a similarity coefficient threshold, determining the first component corresponding to the similarity coefficient in the high-frequency signal data as the effective characteristic component.

6. The method of claim 5, further comprising:

determining the similarity coefficient threshold by processing the pipeline characteristics, the transportation characteristics, and sensor characteristics of the urban pipeline based on a threshold determination model, wherein the threshold determination model is a machine learning model, the threshold determination model is obtained by training based on a plurality of first training samples with first labels, the first training samples include the plurality of sets of sample pipeline characteristics, the sample transportation characteristics, and sample sensor characteristics, and the first labels include the similarity coefficient threshold; wherein the first training samples are determined based on historical data, wherein a construction process of the first labels corresponding to the first training samples includes:

determining a respective prediction accuracy of a plurality of waveform diagrams based on the plurality of waveform diagrams of a plurality of effective characteristic signals obtained from the first training samples under a large number of different reference similarity thresholds; and constructing the first labels corresponding to the first training samples based on a waveform diagram with a highest prediction accuracy;

a training process of the threshold determination model includes:

inputting the plurality of first training samples with the first labels into an initial threshold determination model;

constructing a first loss function through the first labels and results of the initial threshold determination model;

iteratively updating parameters of the initial threshold determination model by gradient descent based on the first loss function; and in response to a first preset condition being met, completing the training process, and obtaining the threshold determination model, wherein the first preset condition refers to the first loss function converging or a count of iteration rounds reaching a first threshold.

7. The method of claim 1, wherein the determining whether the urban pipeline leaks using the effective time-domain waveform diagram, and if the urban pipeline leaks, extracting an average peak value and a mean square amplitude of the effective characteristic signal includes:

determining whether the urban pipeline leaks based on the effective time-domain waveform diagram and a standard waveform diagram, wherein the standard waveform diagram refers to a time-domain waveform diagram corresponding to an original signal generated by a pipeline without leakage;

in response to determining that the urban pipeline leaks, calculating the average peak value and the mean square amplitude of the effective characteristic signal using following formulas:

$$H_{am} = \frac{1}{N}\sum_{t=0}^{N}|X_{new}(t)|$$

$$H_{rms} = \sqrt{\frac{1}{N}\sum_{t=0}^{N-1}(X_{new}(t)-\bar{x})^2}$$

wherein N denotes a length of the effective characteristic signal, $\bar{x}$ represents an average value of the effective characteristic signal, $X_{am}$ denotes the average peak value of the effective characteristic signal, and $X_{rms\_}$ denotes the mean square amplitude of the effective characteristic signal.

8. The method of claim 1, wherein the analyzing a leakage aperture of the urban pipeline according to the average peak value, the mean square amplitude, and a preset aperture function includes:

calculating the leakage aperture of the urban pipeline based on the average peak value and the mean square amplitude by a following formula:

$$f(x) = \frac{X_{rms}}{X_{am}} = b_1x^4 + b_2x^3 + b_3x^2 + b_4x + b_5$$

wherein $f(x)$ represents the aperture function, x represents the leakage aperture, $b_1$-$b_5$ represent parameters of the aperture function, $X_{am}$ denotes the average peak value of the effective characteristic signal, and $X_{rms}$ denotes the mean square amplitude of the effective characteristic signal.

9. The method of claim 1, wherein the analyzing a leakage aperture of the urban pipeline according to the average peak value, the mean square amplitude, and a preset aperture function includes:

calculating the leakage aperture of the urban pipeline based on the average peak value and the mean square amplitude by a following formula:

$$f(x)=X_{rms}=b_1x^4+b_2x^3+b_3x^2+b_4x+b_5$$

wherein $f(x)$ represents the aperture function, x represents the leakage aperture, $b_1$-$b_5$ represent parameters of the aperture function, and $X_{rms}$ denotes the mean square amplitude of the effective characteristic signal.

10. The method of claim 1, wherein the analyzing a leakage aperture of the urban pipeline according to the average peak value, the mean square amplitude, and a preset aperture function includes:

calculating the leakage aperture of the urban pipeline based on the average peak value and the mean square amplitude by a following formula:

$$f(x)=X_{am}=b_1x^4+b_2x^3+b_3x^2+b_4x+b_5$$

wherein $f(x)$ represents the aperture function, x represents the leakage aperture, $b_1$-$b_5$ represent parameters of the aperture function, and $X_{am}$ denotes the average peak value of the effective characteristic signal.

11. The method of claim 1, wherein the obtaining sample data of the infrasonic original signal includes:
controlling an information collector to collect an original signal, the information collector including an ultrasonic sensor, an infrasonic sensor, and a pressure sensor; and
controlling the information collector to sample the original signal at intervals to obtain the sample data of the infrasonic original signal.

\* \* \* \* \*